United States Patent
Pydin et al.

(10) Patent No.: US 11,489,381 B2
(45) Date of Patent: Nov. 1, 2022

(54) ROTOR STRUCTURE FOR ELECTRIC MOTOR

(71) Applicant: Honda Motor Co., Ltd., Tokyo (JP)

(72) Inventors: Andrii Pydin, Saitama (JP); Shigeru Koyama, Saitama (JP); Yasuhito Takei, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 302 days.

(21) Appl. No.: 15/930,424

(22) Filed: May 12, 2020

(65) Prior Publication Data

US 2020/0366143 A1 Nov. 19, 2020

(30) Foreign Application Priority Data

May 17, 2019 (JP) ............................. JP2019-094064

(51) Int. Cl.
| | |
|---|---|
| H02K 1/27 | (2022.01) |
| H02K 1/32 | (2006.01) |
| H02K 1/276 | (2022.01) |
| H02K 15/00 | (2006.01) |

(52) U.S. Cl.
CPC .............. *H02K 1/276* (2013.01); *H02K 1/32* (2013.01); *H02K 15/0006* (2013.01)

(58) Field of Classification Search
CPC ...... H02K 1/276; H02K 1/32; H02K 15/0006; H02K 1/2766
See application file for complete search history.

(56) References Cited

U.S. PATENT DOCUMENTS

| | | | |
|---|---|---|---|
| 2012/0025642 A1* | 2/2012 | Onimaru | H02K 1/32 310/64 |
| 2012/0146336 A1 | 6/2012 | Hori et al. | |
| 2016/0261158 A1* | 9/2016 | Horii | H02K 1/274 |

FOREIGN PATENT DOCUMENTS

| | | | | |
|---|---|---|---|---|
| CN | 208571743 U | * | 3/2019 | ............... H02K 1/27 |
| JP | 2001032914 | | 2/2001 | |
| JP | 2006158018 | | 6/2006 | |
| JP | 2012125034 | | 6/2012 | |
| JP | 2017208883 | | 11/2017 | |
| JP | 2018085871 | | 5/2018 | |

OTHER PUBLICATIONS

"Office Action of Japan Counterpart Application", dated Mar. 15, 2022, with English translation thereof, p. 1-p. 6.

* cited by examiner

*Primary Examiner* — Thomas Truong
(74) *Attorney, Agent, or Firm* — JCIPRNET

(57) ABSTRACT

A rotor structure of an electric motor includes a rotor and a stator. The rotor is fixed to a motor shaft and rotates integrally with the motor shaft. The stator is fixed around the rotor. The rotor includes a cylindrical rotor core coaxially press-fitted and fixed to the motor shaft, a pair of ring-shaped end surface plates disposed facing two axial end surfaces of the rotor core, and permanent magnets respectively housed in slots penetrating an outer peripheral portion of the rotor core in an axial direction. A plurality of openings in which the permanent magnets are exposed are formed in a circumferential direction in an outer peripheral portion of one of the end surface plates, and a ring-shaped cover that covers the openings is detachably attached to an outer end surface of the outer peripheral portion of the end surface plate.

3 Claims, 5 Drawing Sheets

ROTOR STRUCTURE FOR ELECTRIC MOTOR

CROSS-REFERENCE TO RELATED APPLICATION

This application claims the priority benefits of Japanese application no. 2019-094064, filed on May 17, 2019. The entirety of the above-mentioned patent application is hereby incorporated by reference herein and made a part of this specification.

BACKGROUND

Technical Field

The disclosure relates to a rotor structure that makes it easy to take out permanent magnets provided in a rotor of an electric motor for reuse.

Description of Related Art

Generally, an electric motor includes a rotor and a stator. The rotor is fixed to a motor shaft and rotates integrally with the motor shaft, and the stator is fixed around the rotor. Here, the rotor is configured to include a cylindrical rotor core coaxially press-fitted and fixed to the motor shaft, a pair of ring-shaped end surface plates disposed facing two axial end surfaces of the rotor core, and permanent magnets respectively housed in a plurality of slots that penetrate the outer peripheral portion of the rotor core in the axial direction (for example, see Patent Document 1).

However, when the electric motor reaches the end of its service life, the permanent magnets provided in the rotor are taken out to be reused. In such cases, it is necessary to remove the pair of end surface plates that cover two axial end surfaces of the rotor core in which the permanent magnets are incorporated.

RELATED ART

Patent Document

[Patent Document 1] Japanese Laid-Open No. 2017-208883

SUMMARY

Problems to be Solved

However, for the conventional electric motor rotor, the pair of end surface plates are press-fitted to the motor shaft, so it is not easy to remove these end surface plates from the motor shaft. Therefore, it is not easy to take the permanent magnets out of the rotor core for reuse.

In view of the above, the disclosure provides a rotor structure for an electric motor that makes it easy to take the permanent magnets out of the rotor core for reuse.

Means for Solving the Problems

The disclosure provides a rotor (3) structure of an electric motor (1), including: a rotor (3) fixed to a motor shaft (2) and rotating integrally with the motor shaft (2); and a stator (4) fixed around the rotor (3). The rotor (3) includes a cylindrical rotor core (6) coaxially press-fitted and fixed to the motor shaft (2); a pair of ring-shaped end surface plates (7, 8) disposed facing two axial end surfaces of the rotor core (6); and permanent magnets (9) respectively housed in a plurality of slots (6a) penetrating an outer peripheral portion of the rotor core (6) in an axial direction. A plurality of openings (7a) in which the permanent magnets (9) are exposed are formed in a circumferential direction in an outer peripheral portion of one of the end surface plates (7), and a ring-shaped cover (11) that covers the openings (7a) is detachably attached to an outer end surface of the outer peripheral portion of the end surface plate (7).

According to the disclosure, if the cover is removed, the plurality of openings of one of the end surface plates covered by the cover are opened, and the permanent magnets housed in the plurality of slots of the rotor core are exposed in these openings. Therefore, the permanent magnets can be easily taken out of the openings of the end surface plate for reuse without removing the end surface plate.

In the above rotor structure, a flange part (7A) may protrude integrally on an outer peripheral edge of one of the end surface plates (7) to which the cover (11) is attached, an outer periphery of the cover (11) may be spline-fitted to an inner periphery of the flange part (7A), and the cover (11) may be locked by a locking tool (12) that engages with the inner periphery of the flange part (7A) of the end surface plate (7).

According to the above configuration, if the locking tool is removed, the cover with the outer periphery spline-fitted to the inner periphery of the flange part of the end surface plate can be easily removed in the axial direction.

In addition, a cutout (11b) may be formed on a part of an outer peripheral edge of the cover (11).

According to the above configuration, by rotating the cover to adjust the angular position of the cutout (light-weight portion) in the circumferential direction, the rotational balance of the rotor can be adjusted appropriately to reduce the rotational vibration of the rotor.

Further, an inner peripheral edge portion of the cover (11) may be bent outward in the axial direction, an opening gap (S) may be formed between a bent part (11A) and one of the end surface plates (7), an oil passage (10) penetrating the rotor core (6) in the axial direction may be open in the opening gap (S), and an oil hole (2a) that is open toward the opening gap (S) may penetrate the motor shaft (2) in a direction perpendicular to an axis.

According to the above configuration, due to the rotation of the motor shaft, lubricating oil is jetted outward in the radial direction from the oil holes penetrating the motor shaft by centrifugal force. Then, the lubricating oil jetted from the oil holes of the motor shaft is received by the opening gap formed between the bent part of the cover and one of the end surface plates, and flows through the oil passages that open in the opening gap. Therefore, the rotor is cooled by the lubricating oil and the temperature rise is suppressed.

Effects

According to the disclosure, the permanent magnets can be easily taken out of the rotor core for reuse.

DESCRIPTION OF THE EMBODIMENTS

Embodiments of the disclosure will be described hereinafter with reference to the accompanying drawings.

Figure 1:
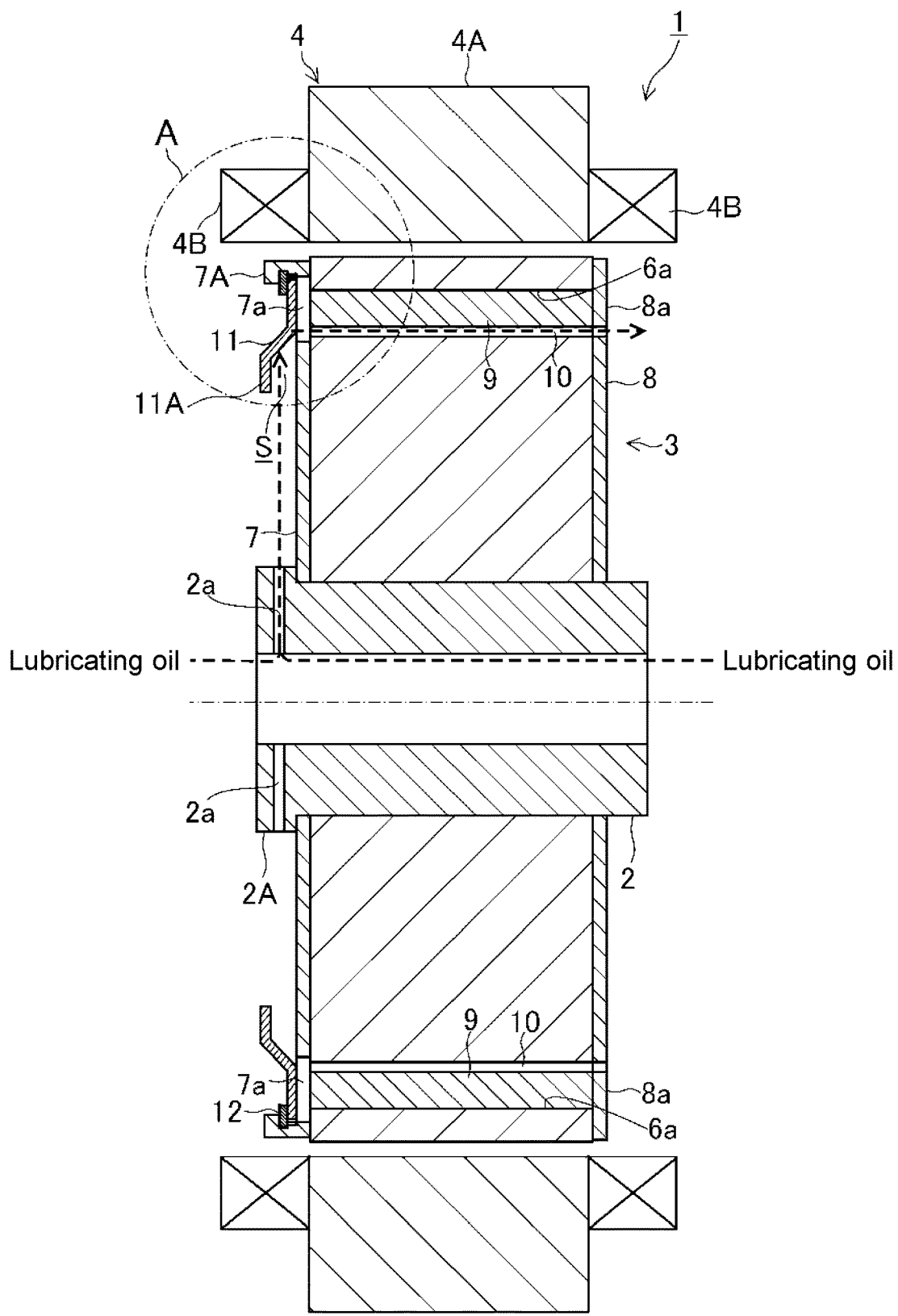
FIG. 1 is a longitudinal cross-sectional view of main parts of an electric motor including a rotor structure according to the disclosure.
Figure 2:
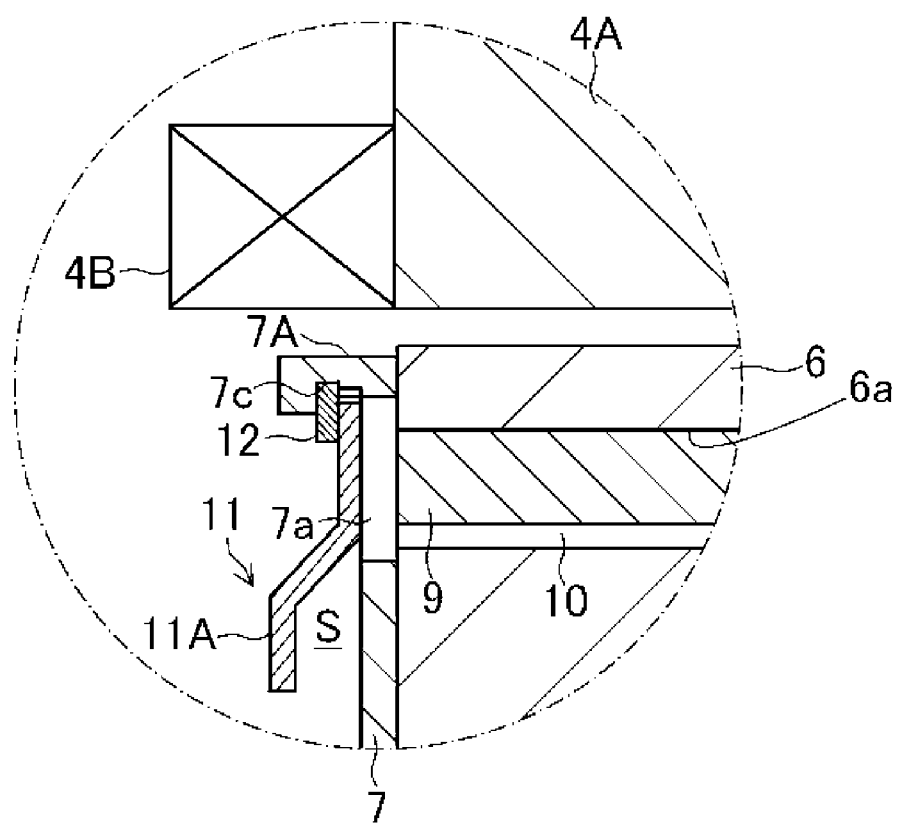
FIG. 2 is an enlarged detailed view of a portion A in FIG. 1.
Figure 3:
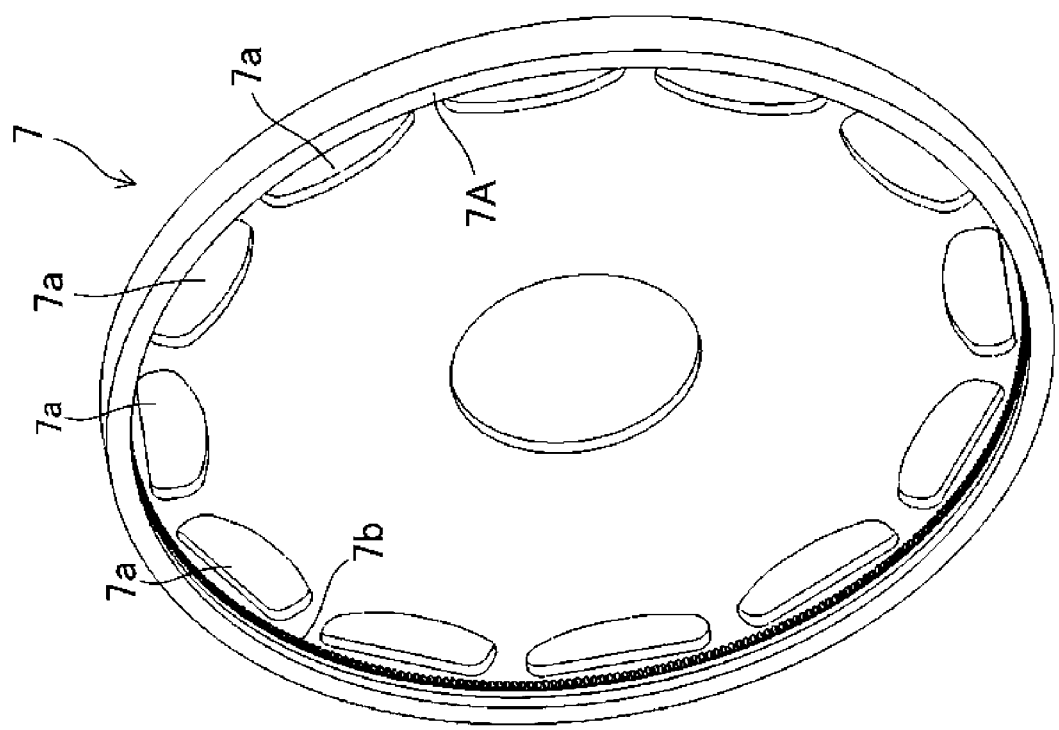
FIG. 3 is a perspective view of an end surface plate and a cover provided on a rotor of the electric motor.
Figure 3:
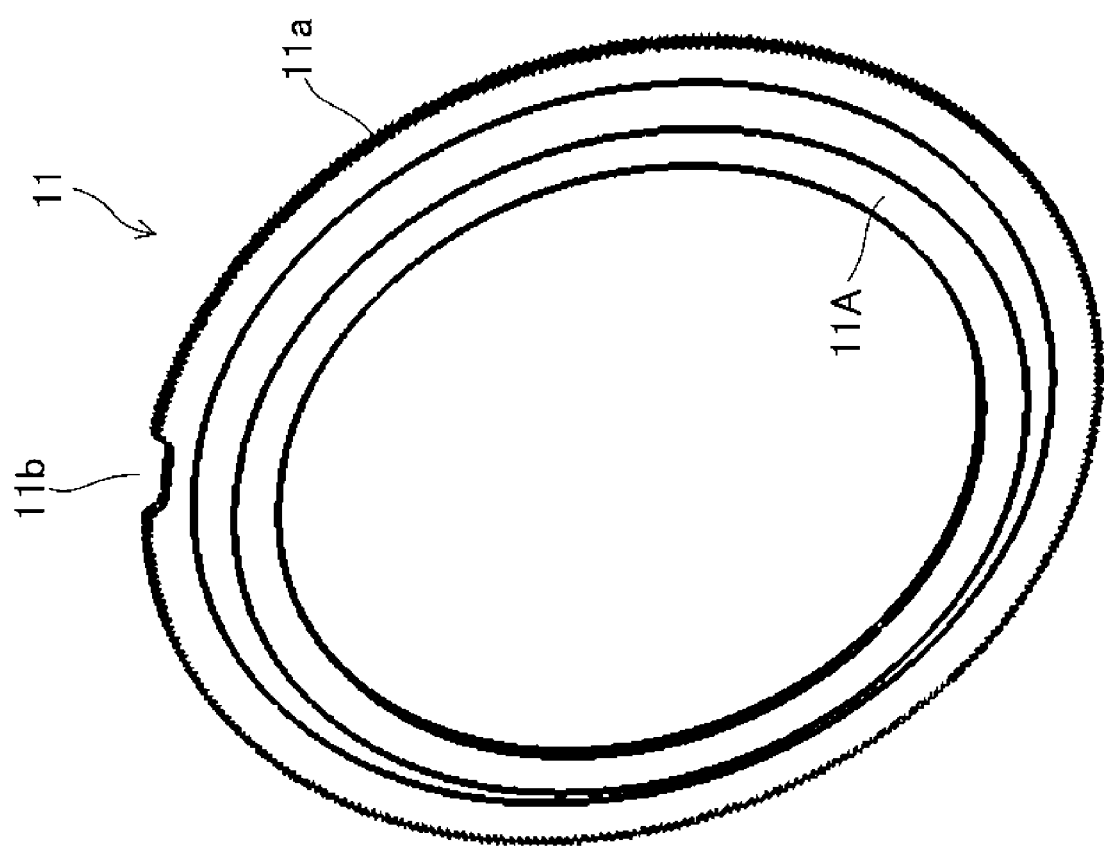
Figure 4:
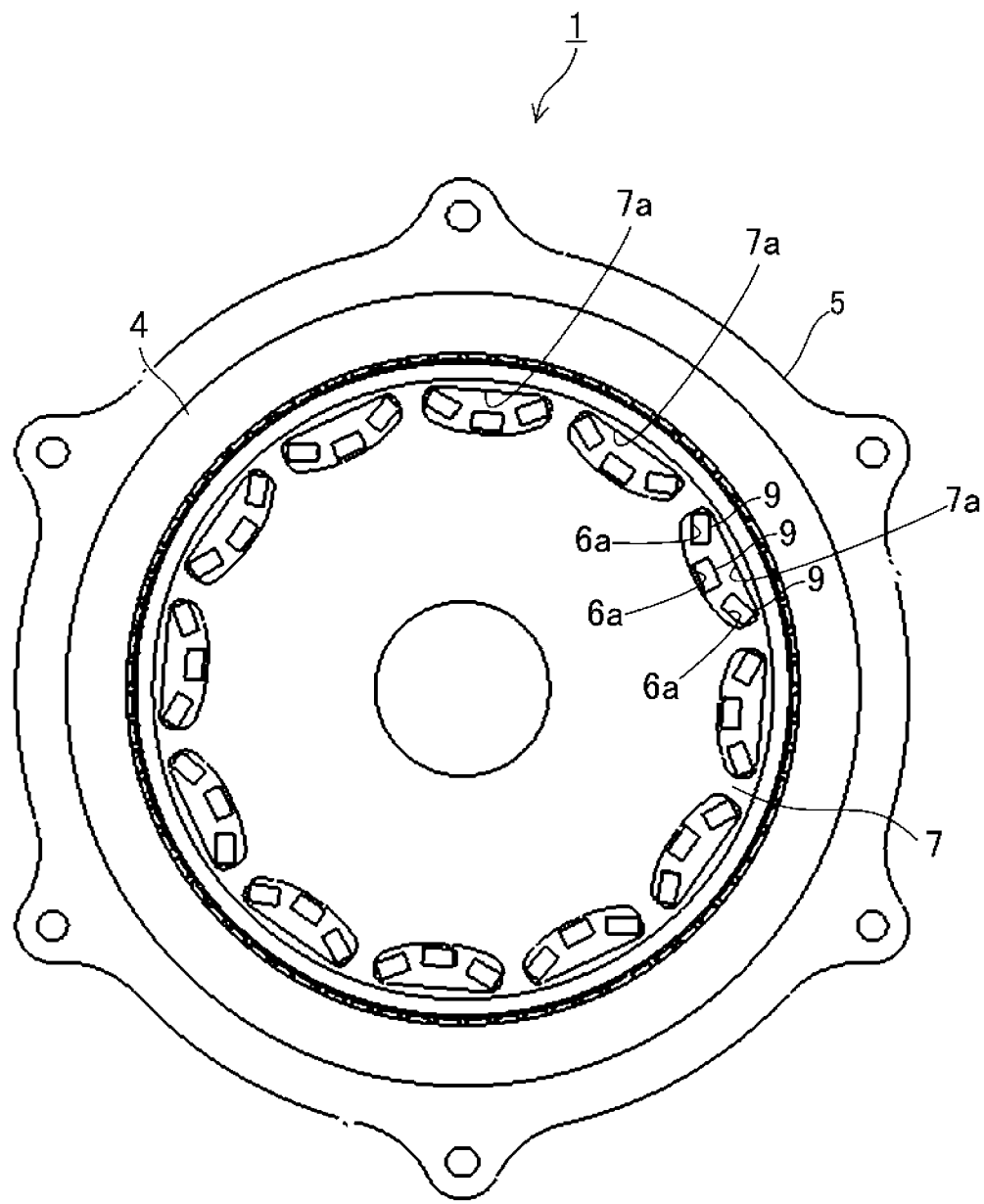
FIG. 4 is a front view showing a state where the cover of the electric motor is removed.
Figure 5:
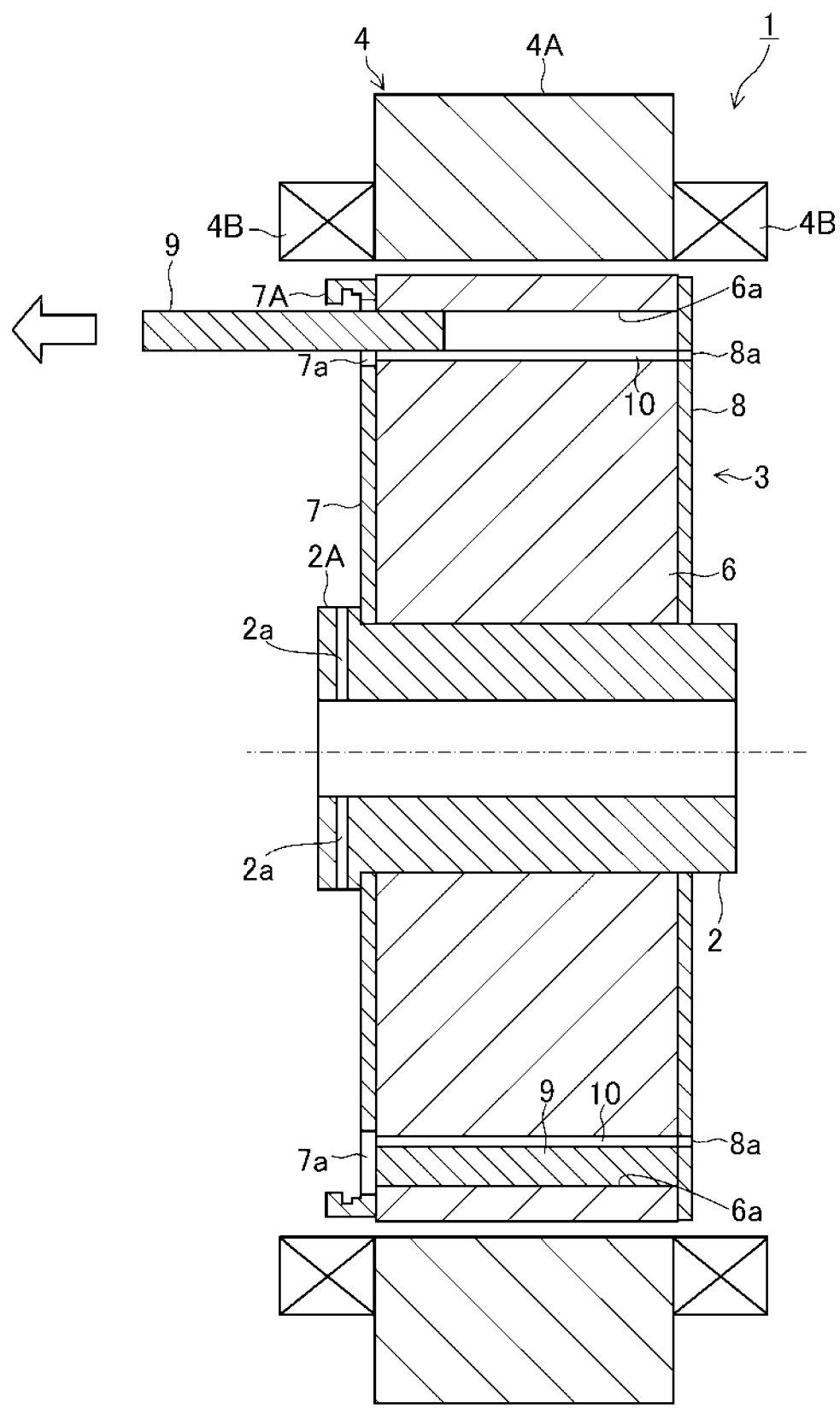
FIG. 5 is a longitudinal cross-sectional view showing a state where permanent magnets are taken out of a rotor core of the electric motor.

FIG. 1 is a longitudinal cross-sectional view of main parts of an electric motor including a rotor structure according to the disclosure, FIG. 2 is an enlarged detailed view of a portion A in FIG. 1, FIG. 3 is a perspective view of an end surface plate and a cover provided on a rotor of the electric motor, FIG. 4 is a front view showing a state where the cover of the electric motor is removed, and FIG. 5 is a longitudinal cross-sectional view showing a state where permanent magnets are taken out of a rotor core of the electric motor.

The electric motor 1 shown in FIG. 1 includes a rotor 3 and a stator 4. The rotor 3 is fixed to a motor shaft 2 and rotates integrally with the motor shaft 2. The stator 4 is fixed around the rotor 3. Here, the motor shaft 2 is a hollow shaft and is disposed to be rotatable at the central portion of a cylindrical motor housing 5 shown in FIG. 4.

The rotor 3 includes a cylindrical rotor core 6 coaxially press-fitted and fixed to the motor shaft 2, a pair of ring-shaped end surface plates 7 and 8 disposed facing and in close contact with two axial end surfaces of the rotor core 6; and permanent magnets 9 respectively housed in a plurality of slots 6a that penetrate the outer peripheral portion of the rotor core 6 in the axial direction.

The rotor core 6 is formed in a cylindrical shape by laminating a plurality of ring-plate-shaped electromagnetic steel plates (not shown) along the axial direction, and the plurality of slots 6a that penetrate in the axial direction are arranged at appropriate intervals in the circumferential direction in the outer peripheral portion of the rotor core 6. More specifically, as shown in FIG. 4, the plurality of slots 6a each having a rectangular cross section and penetrating in the axial direction (a direction perpendicular to the paper surface of FIG. 4) are formed in the outer peripheral portion of the rotor core 6, and every three slots 6a form a group and a total of twelve groups of the slots 6a are arranged at equal angular pitches (30° pitch) in the circumferential direction. Therefore, 3×12 groups=36 slots 6a are arranged in the outer peripheral portion of the rotor core 6, and prismatic permanent magnets 9 are respectively housed in the slots 6a in a state of penetrating in the axial direction. Thus, 36 permanent magnets 9 having the same number as the number (36) of the slots 6a are incorporated in the outer peripheral portion of the rotor core 6.

Then, as shown in FIG. 1, a plurality of (only two are shown in FIG. 1) oil passages 10 penetrate in the axial direction on the inner diameter side of the slots 6a of the rotor core 6 and the permanent magnets 9 housed therein.

Further, the pair of end surface plates 7 and 8 are fixed to the outer periphery of the motor shaft 2 by press fitting, and as shown in FIG. 3 and FIG. 4, on the outer peripheral portion of one end surface plate 7 (left side in FIG. 1), twelve long-hole-shaped openings 7a which are elongated in the circumferential direction are formed at equal angular pitch (30° pitch) in the circumferential direction. Here, each opening 7a is formed at a position corresponding to three permanent magnets 9 included in each of the twelve groups incorporated in the rotor core 6, and in a state where a cover 11 (which will be described later; see FIG. 1 to FIG. 3) that covers the openings 7a when the electric motor 1 is assembled is removed, three permanent magnets 9 are respectively exposed in each of the openings 7a formed on the end surface plate 7, as shown in FIG. 4.

The plurality of oil passages 10 penetrating the rotor core 6 in the axial direction are respectively open to the plurality of openings 7a formed on the end surface plate 7. In addition, a plurality of oil holes 8a communicating with the oil passages 10 formed in the rotor core 6 penetrate the outer peripheral portion of the other end surface plate 8 (right side in FIG. 1) in the axial direction.

Furthermore, as shown in FIG. 1 to FIG. 3, a ring-shaped flange part 7A is integrally provided on the outer peripheral edge of one end surface plate 7 to protrude outward in the axial direction (left side in FIG. 1), and spline teeth 7b (see FIG. 3) extending along the axial direction are formed over the entire circumference on the inner periphery of the flange part 7A.

As shown in FIG. 1 and FIG. 2, the ring-shaped cover 11 is detachably attached to the outer end surface (the left end surface in FIG. 1 and FIG. 2) of the outer peripheral portion of one end surface plate 7. The cover 11 covers the plurality of (twelve) openings 7a formed on the outer peripheral portion of the end surface plate 7 from the axially outer side in an attached state, and as shown in FIG. 3, spline teeth 11a extending along the axial direction are formed on the outer periphery of the cover 11. In addition, as shown in FIG. 3, a cutout 11b is formed on a part of the outer peripheral edge of the cover 11.

Then, the spline teeth 11a formed on the outer periphery of the cover 11 are fitted (spline-fitted) to the spline teeth 7b formed on the inner periphery of the flange part 7A of one end surface plate 7 so as to fit the cover 11 to the inner periphery of the flange part 7A of the end surface plate 7 slidably in the axial direction (left-right direction in FIG. 1). Here, as shown in detail in FIG. 2, the axial position of the cover 11 is restricted by a snap ring 12, which is a locking tool that engages with the inner periphery of the flange part 7A of the end surface plate 7, so that the cover 11 is prevented from coming off from the flange part 7A of the end surface plate 7 in the axial direction.

The above-described snap ring 12 is a C-ring-shaped member with a part cut out. In a state of being held with a tool such as pliers and reduced in diameter, the snap ring 12 is fitted into a ring-shaped engagement groove 7c formed over the entire circumference on the inner periphery of the flange part 7A of the end surface plate 7, and if the force compressing the snap ring 12 is released, the diameter of the snap ring 12 expands due to its own elastic restoring force, causing the snap ring 12 to engage with the engagement groove 7c of the flange part 7A of the end surface plate 7 as shown in FIG. 2, position the snap ring 12 in the axial direction as described above, and restrict the axial movement thereof.

Therefore, if the snap ring 12 is reduced in diameter and detached from the engagement groove 7c of the flange part 7A of the end surface plate 7, the cover 11 can be moved in the axial direction to be easily removed from the end surface plate 7. In other words, the cover 11 is detachably attached to the end surface plate 7.

In addition, as shown in FIG. 1 and FIG. 2, the inner peripheral edge portion of the cover 11 is bent in the shape of the character "<" outward in the axial direction (left side in FIG. 1 and FIG. 2), and an opening gap S that is open toward the inner diameter direction is formed between the bent part 11A and the end surface plate 7. Then, the plurality of oil passages 10 penetrating the outer peripheral portion of the rotor core 6 in the axial direction are open in the opening gap S. Also, as shown in FIG. 1, a plurality of (only two are shown in FIG. 1) oil holes 2a that are open toward the opening gap S penetrate a flange part 2A formed on one axial end of the motor shaft 2 in a direction perpendicular to the axis (radial direction).

On the other hand, the stator 4 disposed around the rotor 3 is fixed to the inner periphery of the motor housing 5 shown in FIG. 4. The stator 4 includes cylindrical teeth 4A formed by laminating a plurality of ring-plate-shaped magnetic plates (not shown) along the axial direction, and a coil 4B wound in a ring shape on two axial end surfaces of the teeth 4A via an insulator (electric insulating plate) (not shown).

In the electric motor 1 configured as described above, when power is supplied to the coil 4B of the stator 4 from a power supply (not shown), the rotor 3 rotates together with the motor shaft 2 by electromagnetic induction. At this time, the lubricating oil flowing through the hollow portion of the motor shaft 2 of the electric motor 1 flows outward in the radial direction as indicated by the arrow in FIG. 1 through the plurality of oil holes 2a formed in the motor shaft 2 due to the centrifugal force generated by the rotation of the motor shaft 2. Then, the lubricating oil is jetted outward in the radial direction from the oil holes 2a of the motor shaft 2 and, as indicated by the arrow in FIG. 1, received by the opening gap S formed between the cover 11 and the end surface plate 7, and the received lubricating oil flows from the opening gap S to the plurality of oil passages 10 of the rotor core 6. Therefore, the rotor core 6 is cooled by the lubricating oil flowing through the oil passages 10 and the temperature rise is suppressed, and the lubricating oil provided for cooling the rotor core 6 is discharged to the motor housing 5 (see FIG. 4) from the plurality of oil holes 8a formed on the other end surface plate 8 (right side in FIG. 1). By repeating the above operation, the rotor core 6 is continuously cooled by the lubricating oil.

Here, in the electric motor 1 according to the present embodiment, the cutout 11b is formed on a part of the outer peripheral edge of the cover 11 as shown in FIG. 3, and therefore the cover 11 can be rotated with respect to the end surface plate 7 to adjust the angular position of the cutout (light-weight portion) 11b in the circumferential direction. Thus, the rotational balance of the rotor 3 can be adjusted appropriately to reduce the rotational vibration of the rotor 3.

In addition, when the electric motor 1 is discarded for it has reached the end of its service life, the permanent magnets 9 are taken out of the rotor core 6 for reuse. In the electric motor 1 according to the present embodiment, the permanent magnets 9 are taken out of the rotor core 6 as follows.

That is, if the snap ring 12 is reduced in diameter and removed as described above, the cover 11 that is spline-fitted to the inner periphery of the flange part 7A of the end surface plate 7 can be easily removed in the axial direction. If the cover 11 is removed in this way, the plurality of openings 7a of one end surface plate 7 covered by the cover 11 are opened as shown in FIG. 4 and FIG. 5, and a total of 36 permanent magnets 9 housed in the plurality of (36) slots 6a of the rotor core 6 are exposed in these openings 7a.

Therefore, with the structure of the rotor 3 of the electric motor 1 according to the present embodiment, the permanent magnets 9 can be easily taken out of the openings 7a of the end surface plate 7 in the axial direction (left side in FIG. 5) for reuse, as shown in FIG. 5, without removing the end surface plate 7 fixed to the motor shaft 2 by press-fitting.

Nevertheless, the application of the disclosure is not limited to the embodiments described above, and it is possible to make various modifications without departing from the scope of the claims and the scope of the technical idea described in the specification and drawings.

What is claimed is:

1. A rotor structure of an electric motor, comprising:
    a rotor fixed to a motor shaft and rotating integrally with the motor shaft; and
    a stator fixed around the rotor,
    wherein the rotor comprises a cylindrical rotor core coaxially press-fitted and fixed to the motor shaft; a pair of ring-shaped end surface plates disposed facing two axial end surfaces of the rotor core; and permanent magnets respectively housed in a plurality of slots penetrating an outer peripheral portion of the rotor core in an axial direction, and
    a plurality of openings in which the permanent magnets are exposed are formed in a circumferential direction in an outer peripheral portion of one of the end surface plates, and a ring-shaped cover that covers the openings is detachably attached to an outer end surface of the outer peripheral portion of the end surface plate,
    wherein a flange part protrudes integrally on an outer peripheral edge of one of the end surface plates to which the cover is attached, an outer periphery of the cover is spline-fitted to an inner periphery of the flange part, and the cover is locked by a locking tool that engages with the inner periphery of the flange part of the end surface plate.

2. The rotor structure of the electric motor according to claim 1, wherein a cutout is formed on a part of an outer peripheral edge of the cover.

3. A rotor structure of the electric motor, comprising:
    a rotor fixed to a motor shaft and rotating integrally with the motor shaft; and
    a stator fixed around the rotor,
    wherein the rotor comprises a cylindrical rotor core coaxially press-fitted and fixed to the motor shaft; a pair of ring-shaped end surface plates disposed facing two axial end surfaces of the rotor core; and permanent magnets respectively housed in a plurality of slots penetrating an outer peripheral portion of the rotor core in an axial direction, and
    a plurality of openings in which the permanent magnets are exposed are formed in a circumferential direction in an outer peripheral portion of one of the end surface plates, and a ring-shaped cover that covers the openings is detachably attached to an outer end surface of the outer peripheral portion of the end surface plate,
    wherein an inner peripheral edge portion of the cover is bent outward in the axial direction, an opening gap is formed between a bent part and one of the end surface plates, an oil passage penetrating the rotor core in the axial direction is open in the opening gap, and an oil hole that is open toward the opening gap penetrates the motor shaft in a direction perpendicular to an axis.

* * * * *